United States Patent [19]

Wickham et al.

[11] Patent Number: 4,740,120

[45] Date of Patent: Apr. 26, 1988

[54] THREAD TAPPING MACHINE TOOL

[75] Inventors: John L. Wickham, Glenarm; Ross C. Miller, Millers, both of Md.

[73] Assignee: The J. L. Wickham Company, Inc., Baltimore, Md.

[21] Appl. No.: 839,565

[22] Filed: Mar. 14, 1986

[51] Int. Cl.⁴ ............................ B23G 1/18; B23G 3/08
[52] U.S. Cl. .................................. 408/130; 10/139 R; 408/112
[58] Field of Search ............. 10/139 R; 408/125, 129, 408/130, 714, 112; 409/184, 185

[56] References Cited

U.S. PATENT DOCUMENTS

| 2,902,890 | 9/1959 | Staples | 408/130 |
| 2,930,261 | 3/1960 | Emrick | 408/130 |
| 3,389,413 | 6/1968 | Van Den Kieboom | 408/130 |
| 3,564,970 | 2/1971 | Larsen | 409/185 |
| 4,179,231 | 12/1979 | Hadden | 408/112 |

Primary Examiner—Z. R. Bilinsky

Attorney, Agent, or Firm—Cushman, Darby & Cushman

[57] ABSTRACT

A thread cutting work station includes a carriage assembly mounted on guideways for guided movement under the control of a linear actuator between an initial, home position and a forward position for cutting threads in or upon a workpiece. A collet is connected to a drive motor and carries a tap for thread cutting. In operation, the linear actuator accelerates the carriage assembly from the initial, home position along the guideways towards the workpiece with the rotating tap entering the to-be-threaded bore to initiate the thread cutting operation with the subsequent feed rate controlled by the rotating tap. After completion of the thread cutting step, the drive motor is reversed to withdraw the tap from the threaded bore, and the linear actuator is controlled to rapidly move the carriage assembly to its initial position. The use of a separate linear actuator to advance and retract the carriage assembly allows for the rapid advance and retraction of the tap to and from the to-be-threaded bore to increase overall efficiency.

1 Claim, 5 Drawing Sheets

THREAD TAPPING MACHINE TOOL

BACKGROUND OF THE INVENTION

The present invention relates to machine tools and, more particularly, to machine tools for cutting screw threads in or upon a workpiece.

In the low-volume production of machined parts, thread cutting is oftentimes preformed manually or with the aid of an operator-controlled machine. In the latter situation, for example, a thread cutting tap is mounted in a friction-drive tapping collet, or similar device, which is carried by the rotating spindle of a drill press or similar user-operated machine. The rotating spindle and the tap-carrying collet are advanced by the machine operator toward and into the to-be-threaded bore and retracted after the thread cutting operation is completed. The use of an operator-controlled machine is oftentimes preferred in low-volume production contexts because the cost of each tapping cycle and overall productivity may not be paramount considerations.

Where thread cutting is required at minimum threading cycle costs in high volume production situations, specialized thread tapping work stations have been developed for use as a component in a larger, automated machine system. One such thread cutting work station, known as a leadscrew tapper, includes a rotatably mounted spindle that carries a tap-holding chuck or collet at one end. The spindle is externally threaded at a thread pitch equal to that of the threads to be cut and is also carried in an internally threaded, stationary sleeve so that rotation of the spindle in one direction or the other causes it to advance or retract axially. A hydraulic or other type motor is coupled to the spindle and rotates the spindle in a first direction to advance the spindle and tap toward and into the workpiece to cut the desired threads. After completion of the thread cutting step, the hydraulic motor is reversed to drive the spindle in the opposite direction to retract the tap from the now-threaded bore and return the tap to its initial, home position.

Work stations of the type described function well although the requirement for an externally threaded spindle and matching internally threaded collar for each of the standard thread pitches increases initial fabrication costs of the work station as well as the changeover time for changing from one thread pitch to another. Additionally, the use of screw threads to advance or retract the spindle has attendant operational disadvantages. For example, where a hydraulic motor is used to drive the spindle, the motor is typically driven at full line pressure throughout the entire tapping cycle, that is, when the rotating spindle is advanced under no-load conditions toward the workpiece, during thread cutting, and when the counter rotated spindle is retracted under no-load conditions toward its home position. Thus, the tapping of a few threads in a relatively thin wall section of a workpiece can require a relatively large volume of high pressure hydraulic fluid for full-power driving of the hydraulic motor during a tapping cycle in which thread cutting is effected for a relatively small fraction of the total cycle. Since the externally threaded spindle is advanced or retracted along its operating axis at a feed rate controlled, in part, by the thread pitch of the externally threaded spindle and its supporting collar, the feed rate of the spindle to and from the workpiece is typically fixed by the maximum feed rate for the thread cutting portion of the tapping cycle. Where the distance between the to-be-threaded bore and the home position of the tap is not large, this feed rate limitation does not materially affect the time duration of the tapping cycle or the overall production rate. On the other hand, where the distance between the to-be-threaded bore and the initial position of the tap is large, the time required for the rotating spindle to traverse the distance to the workpiece, effect thread cutting, and retract to its home position can be sufficiently long to adversely lengthen the tapping cycle and affect the overall production rate and associated costs.

In another type of thread cutting work station, a rotary drive motor is mounted on a stationary support and coupled through a splined connection to a rotatably mounted, tap-carrying quill that can be advanced and retracted relative its drive motor to and from a to-be-threaded bore. In this type of arrangement, the axial extension of the splined connection must be such to accommodate the distance between the initial or home position of the tap and the to-be-threaded bore, and, accordingly, this type of arrangement does not allow for the convenient fabrication of compact, modular thread cutting work stations.

SUMMARY OF THE INVENTION

In view of the above, it is an object of the present invention, among others, to provide a work station for forming threads which is more compact and less complex than prior work stations.

It is another object of the present invention to provide a work station for tapping threads in which the tap can be quickly advanced to and from a to-be-tapped bore and yet effect thread cutting at an optimum feed rate.

It is a further object of the present invention to provide a work station for cutting threads that can be quickly advanced to and retracted from a workpiece with a minimum of energy.

In view of these objects, and others, the present invention provides for an improved thread cutting work station for forming threads in or upon a workpiece. A tap-holding chuck or collet is rotatably mounted on a support structure which, in turn, in mounted on guideways for guided movement to and from a workpiece under the control of an actuator. A drive motor is coupled to the tap-holding chuck to rotate the tap at a rotary velocity suitable for thread cutting. The linear actuator causes the rapid acceleration of the support structure to the to-be-threaded bore with sufficient accumulated momentum to drive the rotating tap into the bore to insure immediate and successful initiation of the thread cutting operation. Upon completion of the cutting of the threads, the drive motor is reversed to disengage the tap from the now-threaded bore with the actuator rapidly returning the support structure to its initial position.

In the preferred embodiment, a carriage assembly includes a support plate that carries a hydraulic drive motor and a connected tap-carrying chuck. Guide rails are secured to the support plate and are supported in and guided by appropriate bearings for rectilinear motion between an initial, home position and an advanced position in which the tap effects thread cutting in the workpiece. An actuator, such as a pneumatic or hydraulic cylinder, is connected to the carriage assembly for rapidly moving the carriage assembly between its retracted and forward positions. At the start of the thread cutting cycle, the drive motor is started to rotate the tap, and the actuator is controlled to accelerate the carriage assembly rapidly from its initial position to the workpiece with the accumulated momentum of the advancing carriage assembly causing the rotating tap to impact the entry portion of the to-be-threaded bore with sufficient force to drive the rotating tap into the bore to insure successful initiation of thread cutting. The tap, as it cuts the threads, draws itself into the bore until thread cutting is completed. The rotary drive motor is then reversed to unscrew or disengage the tap from the now-threaded bore, and the carriage assembly is accelerated to its home position to complete the thread cutting cycle. An energy absorbing snubber, in the form of a spring, absorbs a portion of the momentum of the advancing carriage assembly to control the entry of the tap into the to-be-threaded bore, and, if desired, provide energy to assist in returning the carriage assembly to its initial position.

The present invention advantageously allows a thread cutting device to be rapidly advanced to the workpiece with sufficient terminal velocity and momentum to insure entry of the tap into the to-be-threaded bore and successful initiation of the thread cutting operation with the axial feed rate during thread cutting controlled by the tap. Accordingly, work stations can be rapidly advanced to and from the workpiece at rates much higher than previously employed with less energy, particularly when compared to prior tapping stations that utilize a hydraulic motor to effect both thread cutting and transport of the tap to and from the workpiece. Additionally, the use of a guided carriage assembly allows for the construction of a compact, modular work station that is less complex than prior designs.

A principal objective of the present invention is, therefore, the provision of an improved machine tool for efficiently forming threads in or on a workpiece. Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
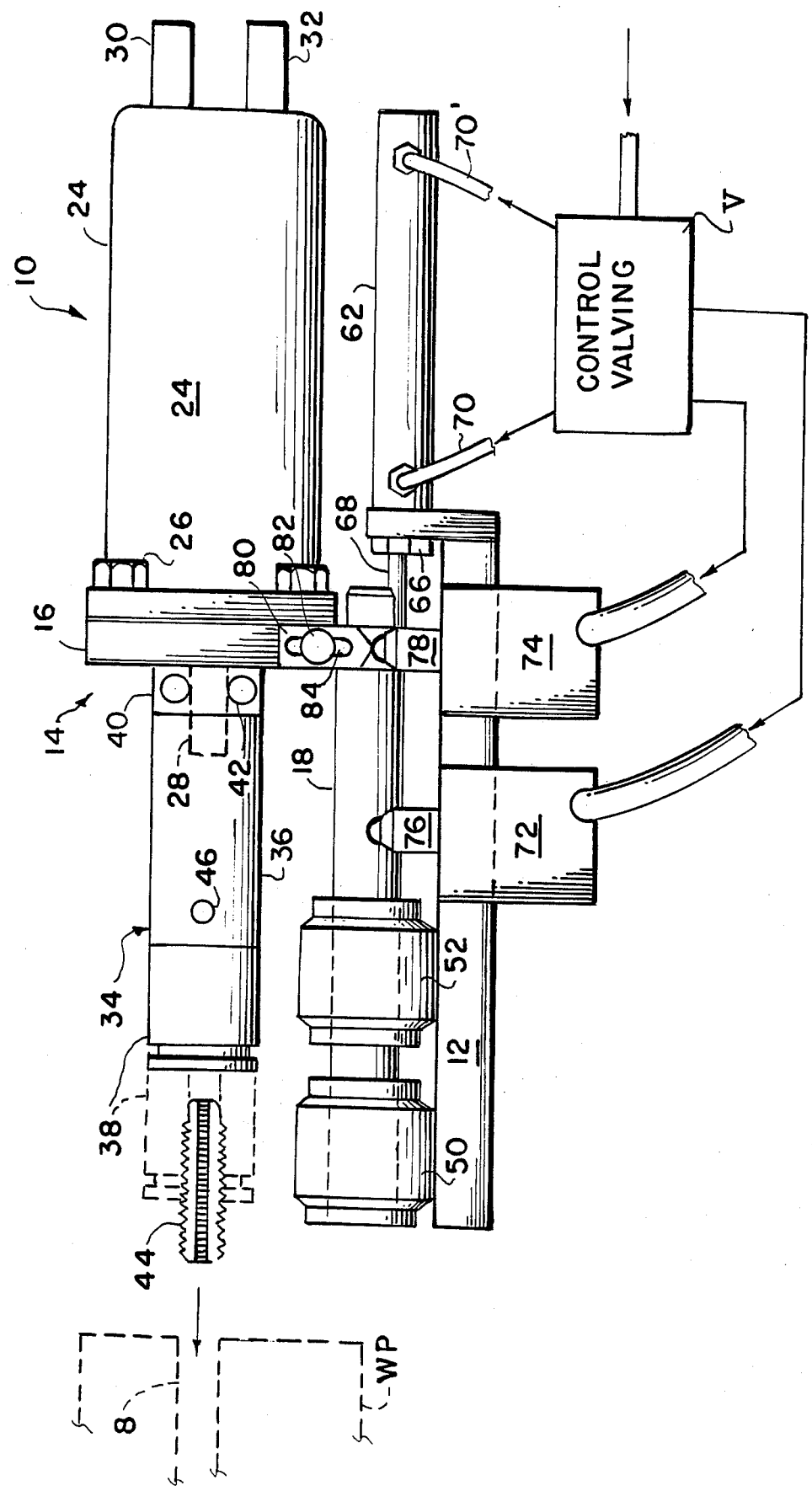
FIG. 1 is a side elevation view of a thread tapping machine tool in accordance with the present invention shown in an initial, home position.
Figure 2:
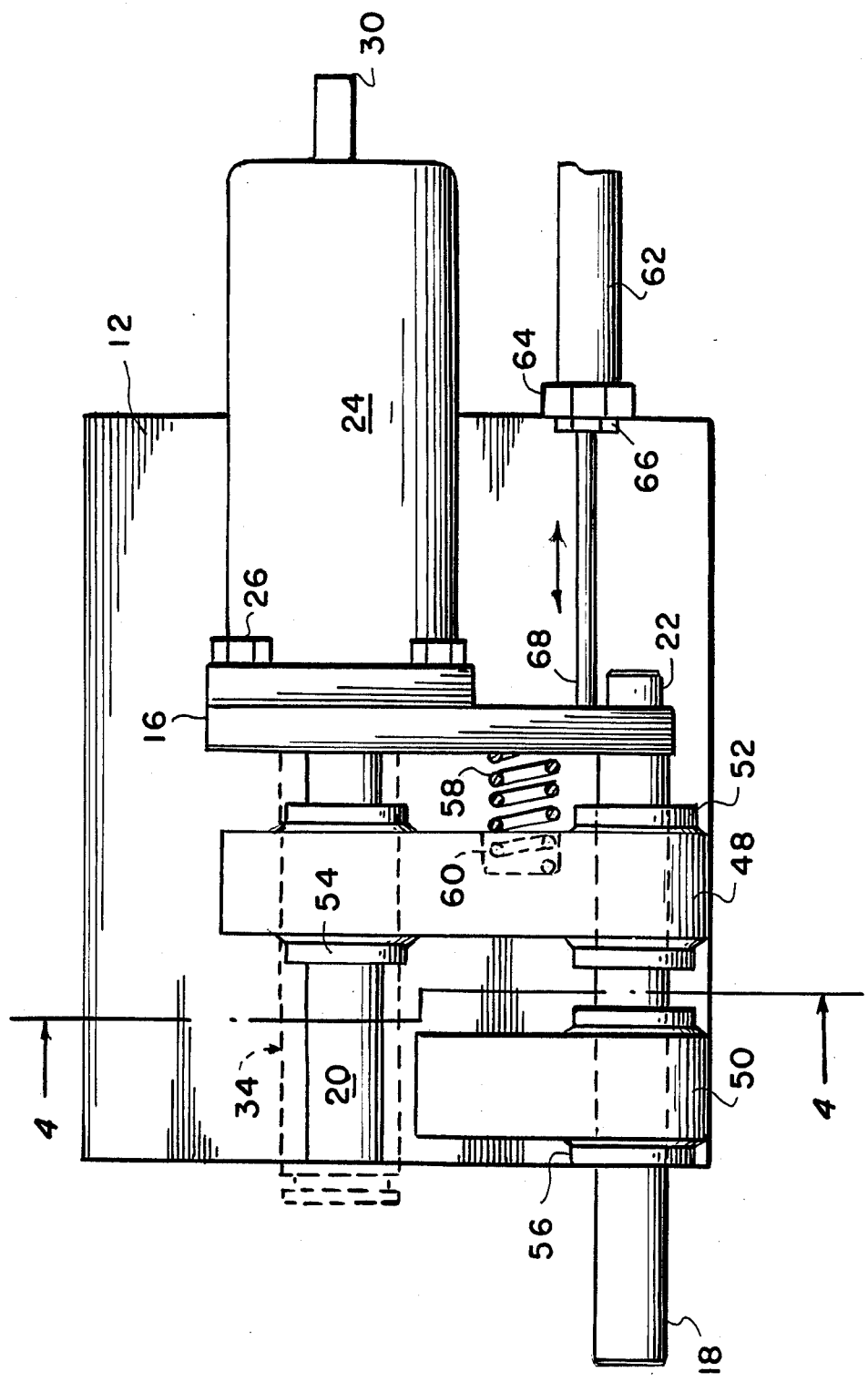
FIG. 2 is a top view of the thread tapping machine of FIG. 1 with selected parts omitted or shown in dashed line illustration for reasons of clarity.
Figure 3:
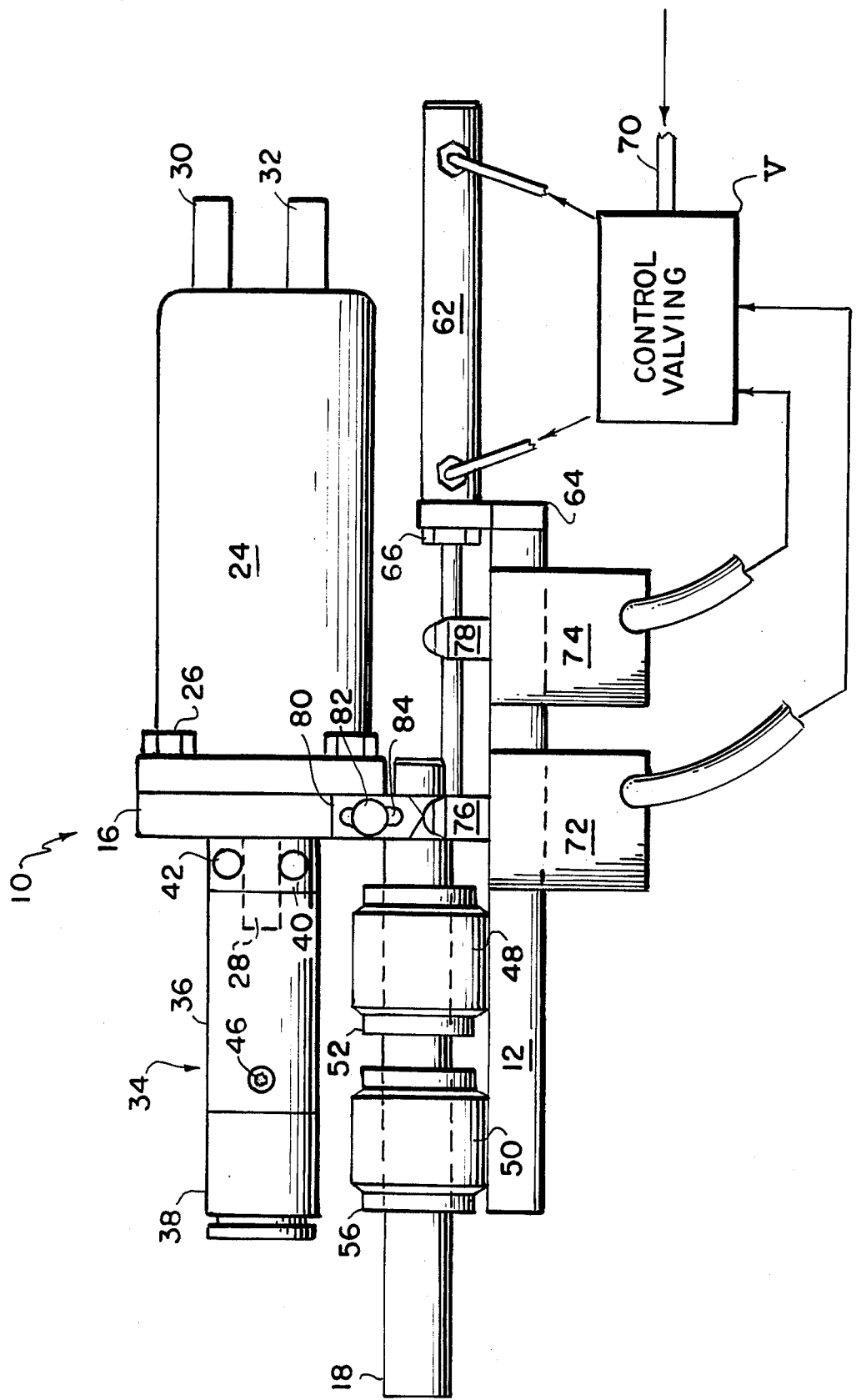
FIG. 3 is a side elevational view of the thread tapping machine of FIG. 1 shown in an advanced, forward position.
Figure 4:
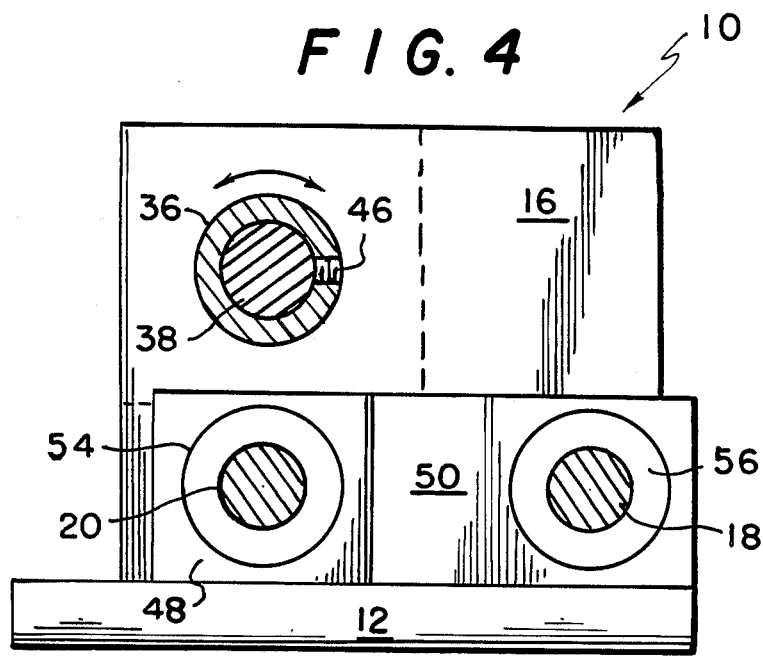
FIG. 4 is a front view, in cross section, of the thread tapping tool taken along line 4—4 of FIG. 1.

A preferred embodiment of a thread tapping machine tool in accordance with the present invention is illustrated in FIGS. 1-4 and designated generally by the reference character 10. As best shown in FIGS. 1, 2, and 3, the thread tapping machine tool 10 includes a generally planar base plate 12 upon which a carriage assembly 14 is mounted for guided movement, as explained more fully below, between a retracted or home position (FIG. 1) and an advanced or forward position (FIG. 3). The carriage assembly 14 is assembled from a mounting plate 16 to which two cylindrical guide shafts 18 and 20 are secured, for example, by threaded fasteners generally indicated at 22 extending through appropriate clearance bores (not shown) formed in the mounting plate 16 to engage a threaded internal bore formed in the end of each of the guide shafts 18 and 20. A reversible hydraulic motor 24 is secured to the mounting plate 16 by threaded fasteners, indicated generally at 26, in the usual manner. The output shaft 28 (dashed line illustration) of the hydraulic motor 24 extends through an appropriately sized clearance bore (not shown) formed in the mounting plate 16. The hydraulic motor 24 is responsive to pressurized fluid selectively directed to ports 30 and 32 to rotate its output shaft 28 in one direction or the other, as explained below.

A spindle assembly 34, which includes a spindle body 36 and a collet 38 or other functionally equivalent chuck at one end, is secured to the output shaft 28 of the hydraulic motor 24 by a clamping plate 40 and threaded fasteners 42. A thread cutting tap 44 is releasably retained in the collet 38 for cutting threads as described below. As shown in FIG. 1 and in cross section in FIG. 4, the collet 38 is inserted into an appropriately sized counterbore (unnumbered) formed in the spindle body 36 and held in place by a set screw 46.

The base plate 12 carries bearing blocks 48 and 50 on its upper surface. Sleeve bearings 52 and 54, preferably of the antifriction ball type, are retained in appropriate bores in the bearing block 48 while another sleeve bearing 56 is retained in the bearing block 50. The guide shaft 18 passes through and is supported by the sleeve bearings 52 and 56 while the guide shaft 20 passes through and is supported by the sleeve bearing 54. While the guide shaft 18 is shown longer than the guide shaft 20 and is also shown as supported by two rather than one sleeve bearings, both shafts may be fabricated with identical length and supported in two or more sleeve bearings. The guide shaft and sleeve bearing configuration allows the carriage assembly 14 to move between a generally retracted or home position, as shown in FIG. 1, and an advanced or forward position, as shown in FIG. 3, to present the thread cutting tap 44 to a to-be-threaded bore B formed in a workpiece WP (dashed line illustration).

Figure 6:
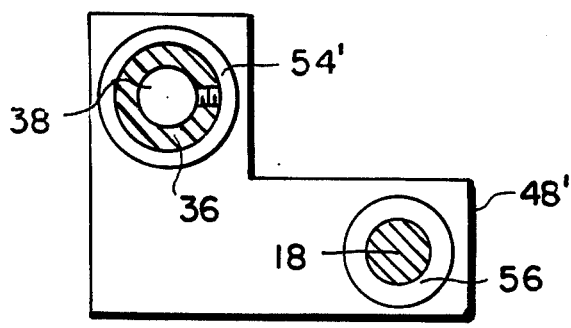
FIG. 6 is a front elevational view of a modified bearing support block.

An alternate embodiment of the guide shaft organization of FIGS. 1-4 is shown in FIG. 6. As shown, a bearing support block 48' carries a sleeve bearing 56 through which the guide shaft 18 is journalled, as described above, and another sleeve bearing 54' through which the spindle body 36 is mounted for both rotation and axial displacement. In this alternate embodiment, the guide shaft 20 is eliminated in favor of the journalled mounting of the spindle body 36, while the guide shaft 18 is journalled in both the sleeve bearings 52 and 56, as presented above in FIGS. 1-4.

A spring 58 (FIG. 2) is retained in an appropriately sized counterbore 60 (dashed line illustration) formed in the bearing block 48 and acts an energy absorbing 'snubber' to absorb a portion of the forward momentum of the carriage assembly 14, as explained below.

A linear actuator 62, preferably in the form of a bidirectional pneumatic cylinder, is mounted to the base plate 12 at one edge using a support plate 64 and a threaded collar 66. An actuator rod 68 extends from the linear actuator 62 and is secured to the mounting plate 16 of the carriage assembly 14. The linear actuator 62 can be selectively operated by application of valving controlled pressurized fluid through ports 70 and 70' to move the carriage assembly 14 to and from its initial, home position as shown in FIG. 1 and its advanced, forward position as shown in FIG. 3.

Position sensing for the carriage assembly 14 is provided by limit switches 72 and 74 secured to base plate 12. The switches 72 and 74 include respective roller-topped plungers 76 and 78. A downwardly pointed, switch actuating lug 80 is adjustably secured to the side of the mounting plate 16 by a fastener 82 that passes through an elongated clearance slot 84. As the carriage assembly 14 is moved to its home position (FIG. 1), the lug 80 depresses the roller-topped plunger 78 of the switch 74, and, conversely, when the carriage assembly 14 is moved to its forward position (FIG. 3), the lug 80 depresses the roller-topped plunger 76 of the switch 72. The switches 72 and 74 provide electrical indications to appropriate control circuitry including electrically controllable valving V for controlling the linear actuator 62.

In operation, the thread tapping machine tool 10 is typically used as part of a larger machine tool system, such as disclosed in commonly assigned co-pending U.S. patent application Ser. No. 06/801,845, filed Nov. 26, 1985 and entitled "Adaptable Machining System." The workpiece WP, shown in dashed line illustration in FIG. 1, is positioned forwardly of and adjacent to the remote end of the threading tap 44 with the previously formed to-be-threaded bore B aligned in general axial registration with the tap 44.

Figure 5:
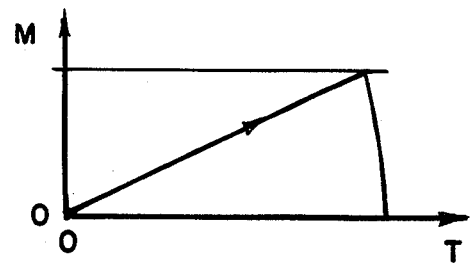
FIG. 5 is a qualitative graphical representation of the momentum of a carriage assembly of the thread tapping machine tool as it moves from its home to its forward position to effect thread cutting.

Upon initiation of the thread cutting cycle, the linear actuator 62 is controlled to forcibly advance the carriage assembly 14 to the left in FIG. 1 with the hydraulic motor 24 simultaneously started to rotate the spindle assembly 34 in the proper direction for thread cutting. As the linear actuator 62 applies its operating force against the carriage assembly 14, the leftward velocity and momentum of the carriage assembly 14 increases, as shown qualitatively in FIG. 5, until the remote end of the tap 44 enters the bore B with contact occurring when the diameter of the tapered end of the tap 44 matches that of the to-be-threaded bore B. The momentum imparted to the carriage assembly 14 by the force applied by the linear actuator 62 during leftward movement is transferred to the workpiece WP in a relatively short collision-like impact to cause the forward-most cutting edges of the tap 44 to immediately 'bite' the interior surface of the bore B to insure successful initiation of thread cutting. Once initiation of thread cutting is achieved, the rotating tap 44 draws itself into the bore B with each successive rotation at an axial feed rate determined by the rotary speed of the hydraulic motor 24 and the pitch of the tap 44. When thread cutting is completed, as indicated by actuation of the limit switch 72, the hydraulic motor 24 is reversed to cause the tap 44 to unscrew and withdraw from the now-threaded bore B, and the linear actuator 62 is controlled in response to the actuation of the limit switch 72 to urge the carriage assembly to its initial position.

An empirically determined optimum linear momentum exists for every combination of tap size, desired thread class, and workpiece material to insure reliable initiation of thread cutting. In general, too low a momentum results in a failure of the forward cutting flutes of the tap to 'bite' and results in the tap enlarging the entry portion of the bore B without initiation of the thread cutting cycle. Conversely, too high a momentum, as a result of too high a force applied by the linear actuator 62, tends to drive the tap 44 too deeply into the bore B and can cause tap breakage, particularly with smaller diameter taps. Momentum is controlled by controlling the force generated by the linear actuator 62 and the time duration that the force is applied to the carriage assembly 14 as well as the impulse snubbing effect provided by the spring 58. As can be appreciated, other energy absorbing devices, including fluidic dashpots and elastomeric equivalents of the spring 58, can be used to implement the snubbing function. The linear actuator 62 can apply its operating force through out the entire range of motion of the carriage assembly 14 or, where desired, can apply its accelerating force for only a portion of the operating range to effectively 'throw' or project the carriage assembly 14 toward the work piece WP. The carriage assembly 14 can thus be caused to 'jump' to and from the work piece WP so that the total transit time of the carriage assembly 14 to and from the work piece WP is only minor portion of the entire thread cutting cycle. The thread tapping machine tool 10 thus allows for shortened thread cutting cycles and an overall increase in productivity.

In the embodiment described, the linear actuator 62 provides an actuating force in one direction or the other to control the carriage assembly 14 motion. If desired, a unidirectional actuator (not shown) can be provided to accelerate the carriage assembly 14 from its initial to its advanced position with the spring 58 compressing to absorb and store a portion of the forward momentum of the carriage assembly 14 while the tap 44 effects thread cutting. After completion of the thread cutting and unscrewing of the tap 44 from the threaded bore, the energy stored in the compressed spring 58 then resiliently forces the carriage assembly 14 to its initial position.

While the preferred embodiment has been illustrated as a thread tapping machine, an appropriately sized die holder can be substituted for the tap-carrying collet 38 to allow external threading of cylindrical shafts.

Thus it will be appreciated from the above that as a result of the present invention, a highly effective thread tapping machine tool is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. A thread tapping machine tool, comprising:
   a carrier assembly including a mounting plate having first and second guide shafts secured thereto substantially perpendicular to the plane of the mounting plate,
   a base plate having first bushing means for receiving said first guide shaft and second bushing means for receiving said second guide shaft and supporting said carrier assembly for guided motion relative to said base plate between a first position and a second position;

a spindle assembly connected to said mounting plate;

spindle driving means for rotatably driving said spindle assembly;

means for retaining a threading tap connected to said spindle assembly;

selectively controllable bidirectional linear actuator means connected to said carrier assembly for driving said carrier assembly relative to said base plate between said first position and said second position;

first switch means actuated by said carrier assembly in said first position to disable said linear actuator from continued driving of said carrier assembly in the direction of the first position;

second switch means actuated by said carrier assembly in said second position to disable said linear actuator from continued driving of said carrier assembly in the direction of the second position;

adjustable switch actuating means connected to said carrier assembly and adjustable to control the actuation of said first switch means to disable said linear actuator from continued driving of said carrier assembly in the direction of the first position and to control the actuation of said second switch means to disable said linear actuator from continued driving of said carrier assembly in the direction of the second position; and means for absorbing the momentum of said carrier assembly when moved from said first to said second position, said energy being sufficient to return said carrier to said first position from said second position.

* * * * *